July 19, 1966 M. C. KNABE 3,261,135
PRECAST CONCRETE BEAM AND COLUMN JOINT CONSTRUCTION
Filed May 16, 1963 4 Sheets-Sheet 1
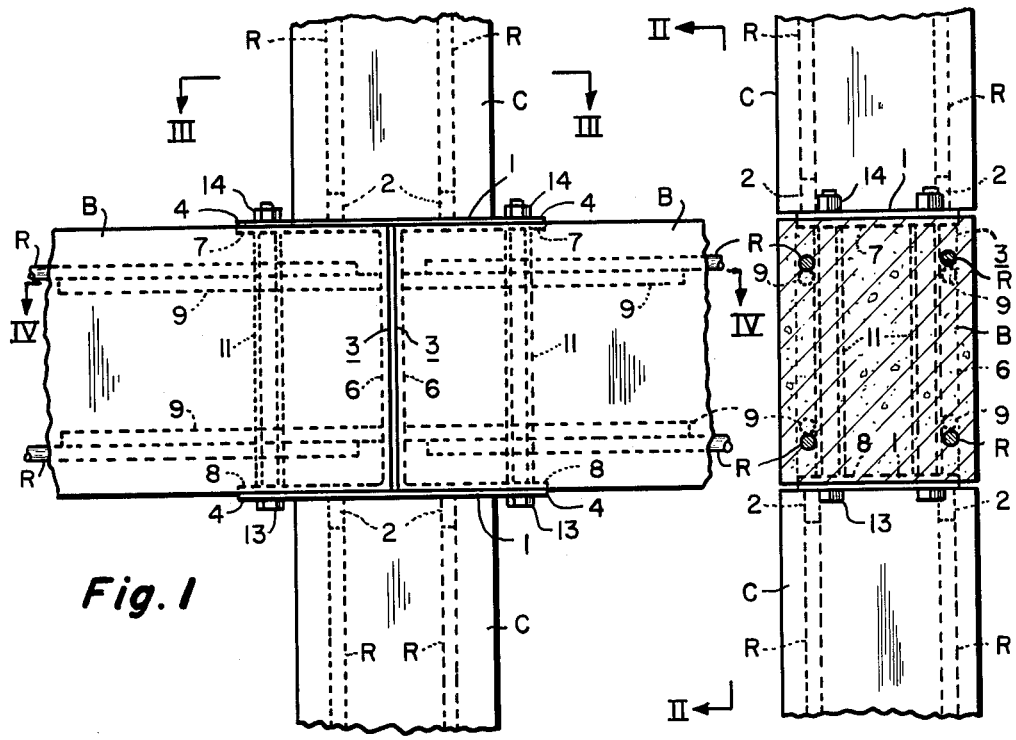
Fig. 1
Fig. 2
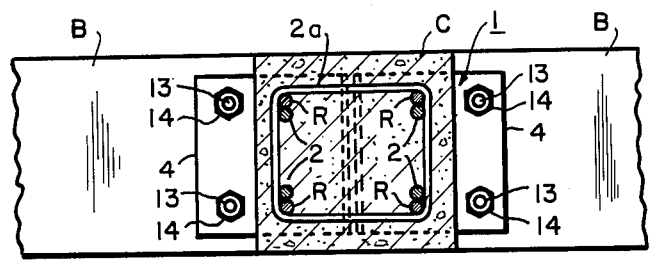
Fig. 3
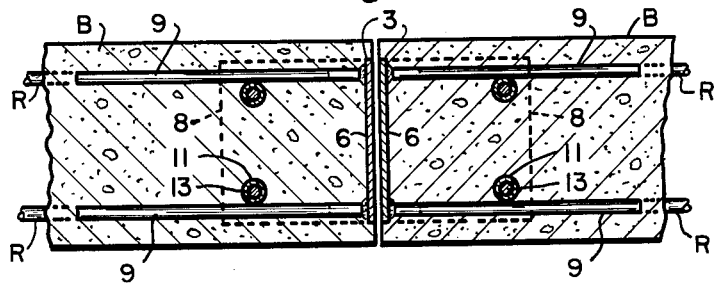
Fig. 4
INVENTOR.
Martin C. Knabe
BY
HIS ATTORNEYS July 19, 1966 M. C. KNABE 3,261,135
PRECAST CONCRETE BEAM AND COLUMN JOINT CONSTRUCTION
Filed May 16, 1963 4 Sheets-Sheet 2

INVENTOR.
Martin C. Knabe
BY
*Webb, Mackey & Burden*
HIS ATTORNEYS

July 19, 1966    M. C. KNABE    3,261,135
PRECAST CONCRETE BEAM AND COLUMN JOINT CONSTRUCTION
Filed May 16, 1963    4 Sheets-Sheet 3

INVENTOR.
Martin C. Knabe
BY
HIS ATTORNEYS

July 19, 1966  M. C. KNABE  3,261,135
PRECAST CONCRETE BEAM AND COLUMN JOINT CONSTRUCTION
Filed May 16, 1963  4 Sheets-Sheet 4

INVENTOR.
Martin C. Knabe

BY
HIS ATTORNEYS

United States Patent Office 3,261,135
Patented July 19, 1966

3,261,135
PRECAST CONCRETE BEAM AND COLUMN
JOINT CONSTRUCTION
Martin C. Knabe, 1017 Oliver Bldg., Bethel Park, Pa.
Filed May 16, 1963, Ser. No. 280,791
8 Claims. (Cl. 52—127)

This invention relates to attaching means for precast concrete building members and more particularly to connectors affixed to precast concrete columns and beams which permit rapid and accurate erection of the columns and beams by means of fastening bolts.

Precast concrete building members require connections at the building site and these connections are often a major construction and design problem. The normal manner of erecting precast concrete columns in the past has been to provide a recess in the member which is to support the column and to place a layer of bonding concrete in the recess. The column is then placed in the recess and the wet concrete forms a seat for the column end. The column is properly aligned before the concrete sets and is secured in position until the concrete sets around the column end to maintain the column in position. After the column is aligned in the recess, additional concrete is poured into the space between the column end and the walls of the recess to help hold the column in position. No further work can be done on the column until the supporting concrete has dried and, thus, the construction of the building is interrupted.

Where horizontal beams or further columns are to be attached to lower columns for an upper story of the building, connecting concrete is used at the joints between members. The use of concrete at these joints causes a further delay in erection due to the required drying time for the connecting concrete.

In view of the above difficulties, numerous connector arrangements have been proposed incorporating bolts for attaching precast concrete members. The prior art connector arrangements are complicated and include undesirable projections or shelves on the columns and beams. Additionally, connecting concrete is often required in addition to the bolts in the prior art connecting arrangements.

My invention provides connectors for use between superposed precast columns; between a precast column and a structural steel column; and between precast columns and precast beams or structural steel girders. The precast members are cast with connectors secured at their ends and these connectors have aligned apertures through which bolts are passed when the members are properly positioned. By using precast concrete members with connectors secured to their ends according to my invention, it is possible to attach the members quickly and accurately with no delay in construction. The delay in construction is eliminated as stability of the structure is obtained by bolts and there is no connecting concrete at the joints which must harden before subsequent construction can be carried out. Further, my invention eliminates extensive shoring and bracing which are necessary to hold the members in position while the connecting concrete dries. Additionally, my novel connector arrangement permits a second or upper column to be placed directly above the lower column, regardless of whether or not horizontal beams are positioned between the columns.

The use of connectors on building members in accordance with my invention provides a structure without any projections or brackets, while still providing a positive connection between the members. Elimination of projections in the area of a joint makes it possible to locate doors and windows in the immediate vicinity of the joint if desired.

In the accompanying drawings, I have shown certain preferred embodiments of my invention in which:

FIGURE 1 is an elevation of a pair of aligned columns having a pair of beams connected to the columns;

FIGURE 2 is a section on the line II—II of FIGURE 1;

FIGURE 3 is a section on the line III—III of FIGURE 1;

FIGURE 4 is a section through the beams on the line IV—IV of FIGURE 1;

Figure 5:
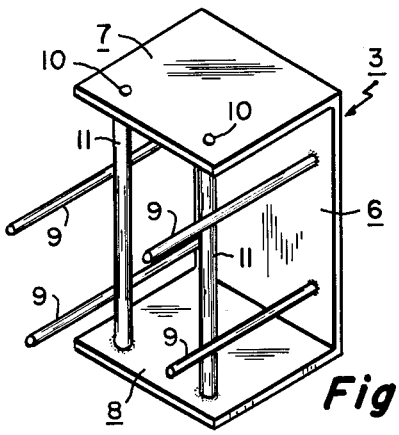
FIGURES 5 and 6 are perspective views of an end cap and an end plate respectively prior to being placed on concrete building members.
Figure 6:
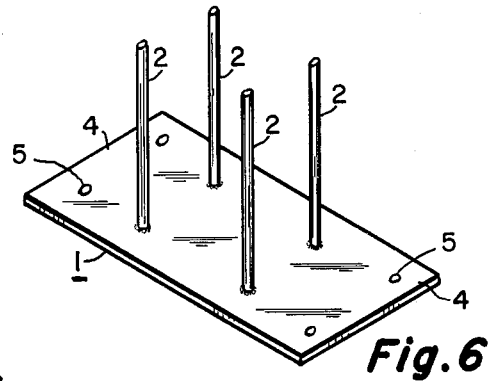

Referring to FIGURES 1–4 of the drawings, an end plate 1 is affixed at each end of a column C. Each plate has a plurality of metal dowels 2 welded to the surface which lies against the end of the column. The dowels are located on the plate so as to be adjacent to the end of a column reinforcing rod R and extend parallel to the end of the reinforcing rods. Before the column is cast, a plate is positioned at each end of a form for the column and a square reinforcing member 2a is positioned around the dowels and rods to hold them together. The concrete is then poured into the form and hardens around the dowels and reinforcing rods to provide a finished column having a connecting plate secured to each end. Any number of rods and dowels may be used, depending upon the size of the column and the load it is to carry. The length of the end plate is sufficient to provide a lip 4 on opposed sides of the column and each lip is provided with a pair of holes 5 for a purpose later described.

The beams B have a C-shaped end cap 3 affixed at each end. The end cap is shown in FIGURE 5 and consists of a base portion 6 which is located on the end of the beam so as to be adjacent the outer surface thereof and two legs 7 and 8 which lie along and are embedded in the top and bottom sides of the beam so as to be flush with the beam surface. A plurality of metal dowels 9 are welded to the base portion of the cap and extend parallel to the legs 7 and 8 and to the ends of reinforcing rods R. Each leg of the end cap is provided with a pair of holes 10 which are aligned with similar holes in the opposite leg. A pipe 11 is welded between the legs in alignment with opposed holes so that a pair of open passages are provided through each end of the beam. The caps and reinforcing rods are positioned in a form and concrete is poured into the form to make a reinforced beam. When the concrete hardens, the finished beam has an end cap secured to each end. Any number of dowels and reinforcing rods may be used in a beam, depending upon the size of the beam and the load it is to carry.

After the column and beams have been precast in the desired size, they are assembled to form a building frame. The lower end of each column C is attached to a footer (not shown) by means of studs cast in the footer which extend through holes 5 in the lower end plate of the column and nuts are threaded on the studs to hold the column in proper position. When the columns are in place, a pair of beams B are placed on the upper ends of adjacent columns and another column may be placed with its lower end plate on the beam ends. The holes 5 in the end plates and the holes 10 and pipes 11 in the beams ends are aligned and a bolt 13 is passed through the aligned holes and corresponding pipe and a nut 14 is affixed on the end of the bolt to firmly position the beams and the columns. A pair of columns can be attached directly to each other if additional height is required.

Figure 7:
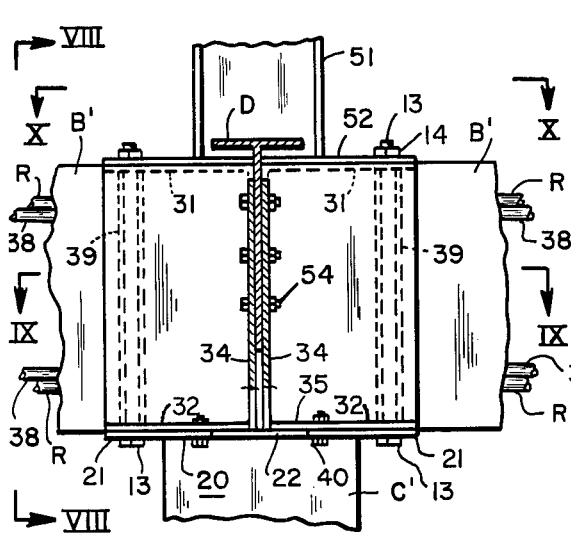
FIGURE 7 is a section on the line VII—VII of FIGURE 8 showing a modification of my connecting arrangement used with a structural steel girder and column.

An alternative connecting arrangement is shown in FIGURES 7–10 for use with structural steel members. The column C' has a plate 20 attached to its upper surface by means of dowels which are welded to the plate and extend into the concrete adjacent the column reinforcing rods R. As shown in FIGURE 7, the ends of the plate 20 extend beyond the sides of the column to form a pair of lips 21 through which holes are drilled. The edge of the plate toward the side of the column facing I-beam D is formed with an extension 22 extending beyond the side of the column and having a pair of holes extending therethrough for a purpose to be set forth hereinafter.

The end caps for the precast beams B' of the modification shown in FIGURES 7–10 have a base portion 30, a top leg 31, a bottom leg 32 and a vertical side portion 33. The side portion 33 is welded to a base portion extension 34 and a bottom leg extension 35 to strengthen the extensions. The extension 34 has a plurality of bolt holes 36 and the bottom leg extension 35 has a bolt hole 37.

A plurality of dowels 38 are welded to the inner surface of the base portion 30 parallel to legs 31 and 32 and side portion 33. The dowels extend into the finished beam B' parallel to reinforcing rods R in the same manner as in beam B. Top leg 31 has a pair of holes and bottom leg 32 has a pair of holes which are aligned with the holes in leg 31. A pair of pipes 39 extend between legs 31 and 32 in alignment with the holes to provide open passageways in the beam for bolts.

The upper column in FIGURES 7–10 is an I-beam 51 with a bottom plate 52 with four bolt holes welded to its lower end.

After the lower end of column C' is fixed in position, beam ends are placed on plate 20 and the bolt holes and pipes in the end of each beam are aligned with the bolt holes in lips 21 of plate 20 and bolt holes 37 in extensions 35 are aligned with the bolt holes in extension 22 of plate 20. A pair of reinforcing or erection bolts 40 are fastened in the aligned holes in extensions 22 and 35 in order to make certain that the beam ends will not be knocked out of alignment when I-beam D is inserted into the space between the extensions 34. Bolts 40 may be removed after the I-beam is in place, if desired.

After precast beams B' are in place, I-beam 51 is positioned on the upper legs of the beam end caps so that the bolt holes in end plate 52 are aligned with the bolt holes and pipes of the beams. The beams and columns are then secured in place by bolts 13 and nuts 14.

Figure 8:
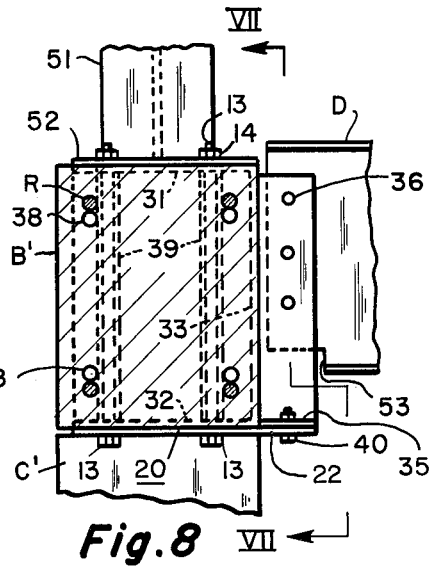
FIGURE 8 is a section on the line VIII—VIII of FIGURE 7 showing the manner in which the girder is attached between a pair of beam end caps.
Figure 9:
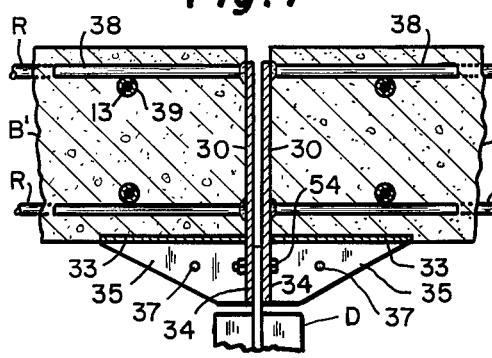
FIGURE 9 is a section through the beams on the line IX—IX of FIGURE 7.
Figure 10:
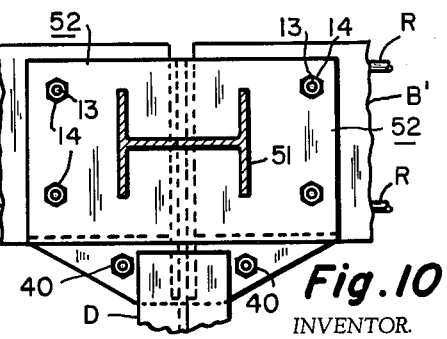
FIGURE 10 is a section on the line X—X of FIGURE 7 showing the structural steel column attached to a plate.

As shown in FIGURE 8, I-beam D is notched at 53 so that the bottom web will not interfere with the connection between the I-beam and the end caps of the beams B'. The end of I-beam D is provided with bolt holes spaced the same distance as bolt holes 36 in extensions 34. After the I-beam is notched, it is fitted between the extensions 34 and bolts 54 are fastened in the aligned holes in the extensions and beam end to hold the beam in position. It is not necessary to notch the upper corner of I-beam D since the top web overlies the upper edge of extensions 34 and, hence, does not interfere with fitting the beam end between the extensions. It is pointed out, however, that the upper corner of the beam may be notched so that the beam end will fit between the extensions if it is desired to use a narrower beam.

Figure 11:
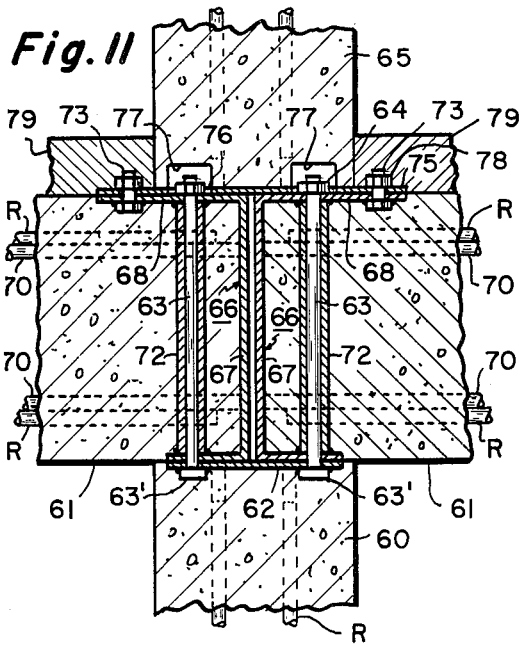
FIGURE 11 is a section on the line XI—XI of FIGURE 16 showing a pair of aligned columns and a pair of beams connected between the columns by a modified connecting arrangement.

The connecting arrangement shown in FIGURES 11–16 provides a completely unobstructed corner at the juncture of the lower column 60 and the beams 61. A plate 62 is embedded in the upper surface of column 60 so that a smooth face is provided on the column end. Dowels are welded to the lower surface of the plate and extend into the concrete column adjacent the column reinforcing rods R to secure the plate on the column and bolts 63 extend through the plate and have enlarged heads 63' which are also welded to the lower surface of the plate. As shown in FIGURE 11, the bolts extend upwardly through passageways formed in the ends of beams 61 and the threaded end of each bolt receives a nut 64 for holding a beam in place on the column end.

The beams 61 are cast with end caps 66 at each end. Each of the end caps 66 has a base portion 67, an upper leg 68 and a lower leg 69 and the caps are attached to the concrete beams by dowels 70 which extend into the beam adjacent the beam reinforcing rods R. The legs 68 and 69 are embedded in the top and bottom surface of the ends of the beams and the lower legs 69 are shorter than the upper legs 68 so that they do not extend beyond the sides of the lower column 60 when the beams are bolted in place. The upper and lower legs of the end caps are provided with aligned holes 71 and pipes 72 are welded between the holes to provide the bolt passageways through the beam ends. A pair of short bolts 73 extend upwardly through holes in the upper leg 68 of each end cap. The heads 73' of the bolts are welded to the underside of the legs and the threaded shafts extend upwardly a sufficient distance to pass through holes 74 in end plate 75 of upper column 65 when the columns and beams are assembled.

Figure 13:
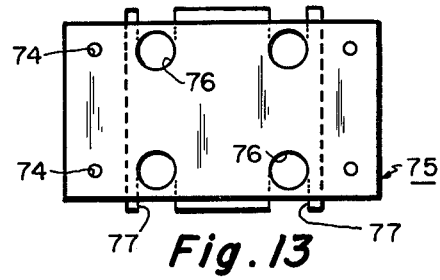
FIGURES 13–16 are sections on the lines XIII—XIII, XIV—XIV, XV—XV and XVI—XVI of FIGURE 12.
Figure 14:
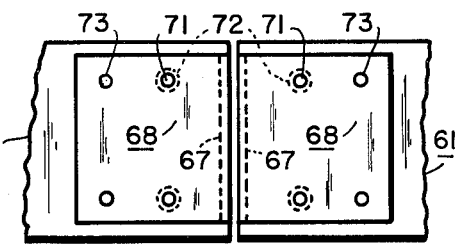
Figure 15:
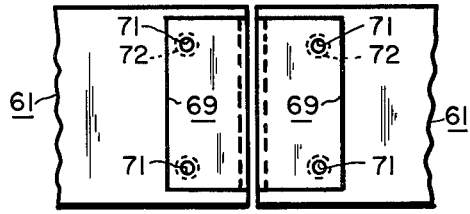
Figure 16:
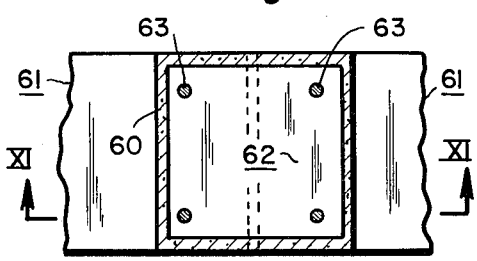
Figure 12:
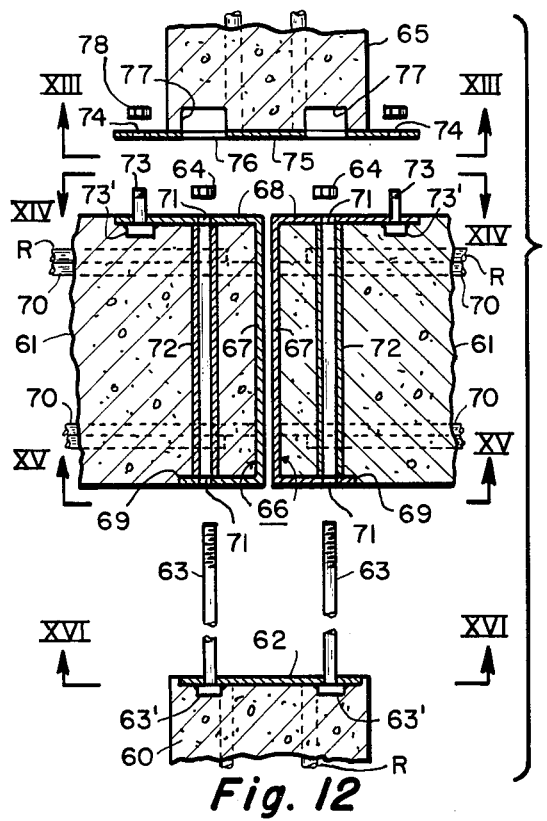
FIGURE 12 is an exploded view of the arrangement shown in FIGURE 11.
Figure 17:
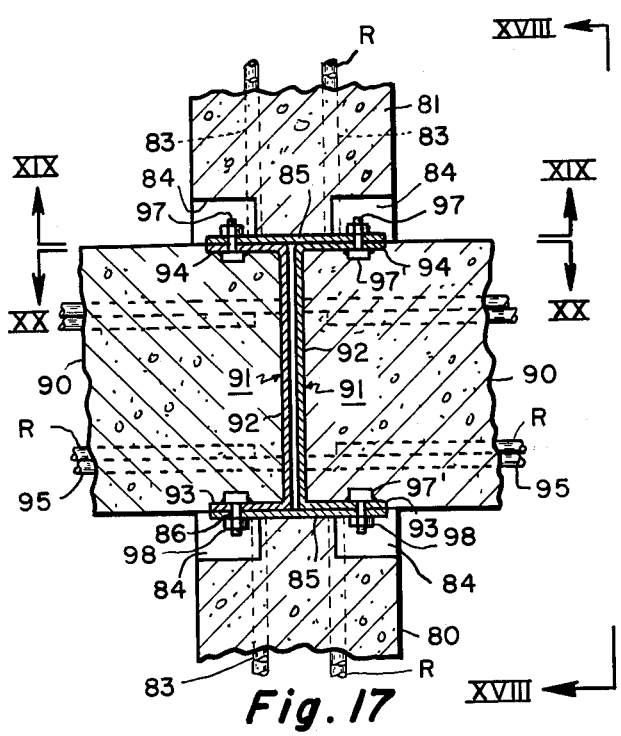
FIGURE 17 is a section on the line XVII—XVII of FIGURE 18 showing another modification of the connecting arrangement between a pair of aligned columns and a pair of beams connected therebetween.
Figure 18:
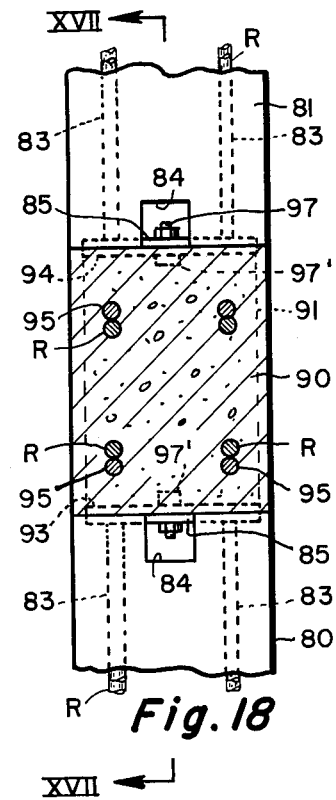
FIGURE 18 is a section on the line XVIII—XVIII of FIGURE 17.
Figure 19:
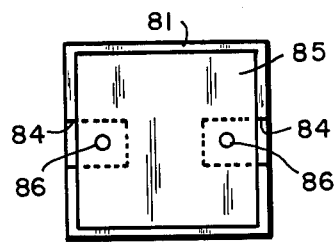
FIGURES 19 and 20 are sections on the lines XIX—XIX and XX—XX of FIGURE 17.
Figure 20:
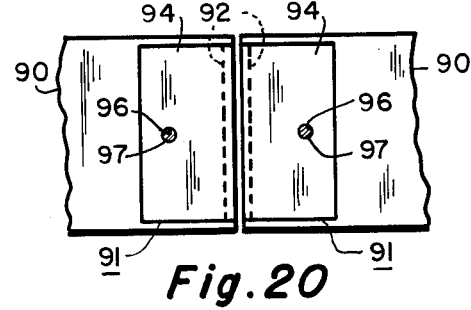

The end plate 75 of the upper column extends beyond opposite sides of column 65 and the extensions have the holes 74 which receive bolts 73. As shown in FIGURES 11–13, the plate 75 has additional holes 76 which are aligned with notches or pockets 77 formed in the end of column 65. The pockets are formed in the concrete column end when the column is cast and, as shown in FIGURE 13, they open to the outer surfaces of the column so that nuts 64 may be threaded on bolts 63.

The column and beams shown in FIGURES 11–16 are assembled by placing the beam ends on column 60 with bolts 63 extending upwardly through pipes 72. After the beams are in position, the upper column 65 is placed on the beam ends and bolts 63 and 73 pass through holes 76 and 74 respectively. The threaded ends of bolt 63 are accessible through the outwardly opening pockets 77 and nuts 64 are threaded on the bolts to firmly affix the beams to lower column 60. Column 65 is affixed to the beam ends by nuts 78 which are threaded on bolts 73. After the nuts 78 are tightened down, a concrete floor 79 may be poured over the nuts up to the column as shown in FIGURE 11. Since the end plate 62 and lower legs 66 are embedded in the precast concrete members with the exception of the contacting surfaces thereof, a completely unobstructed joint is provided at the juncture of the upper end of the lower column and the ends of the beams. The unobstructed joint permits a door or window frame to be placed flush with the joint between the column and the beam if required by the building specifications.

The modification shown in FIGURES 17–20 provides an assembly in which all junctures between a beam and a column are unobstructed. An end plate 85 is affixed to the upper end of column 80 and to the lower end of column 81. The plates are embedded in the concrete at the column ends and dowels 83 are welded to the surface of the plates in contact with the concrete and extend into the column adjacent reinforcing rods R to secure the end plates to the columns. The column ends are cast with notches 84 in opposite sides and plates 85 have holes 86 aligned with the notches for a purpose to be described hereinafter. The cross-section of the columns is large enough to provide adequate strength, even though a portion of the concrete has been omitted at the column end to form the notches 84 and, for this reason, no filler concrete is needed in the finished structure. If an unobstructed joint is desired between the lower end of a column and a footer, the lower end of the column may be provided with a plate 85 and notches 84. Although only one notch has been shown on each side of the columns, it should be understood that a plurality of notches may be formed on one side of the columns and a plurality of bolts may be used on the corresponding beam cap leg if additional strength is required at a joint.

The beams 90 have a C-shaped end cap 91 affixed at their adjacent ends. The end caps consist of a base portion 92 which is located in contact with the beam end and legs 93 and 94 which are embedded in the top and bottom surfaces of the beam end. A plurality of dowels 95 are welded to the base portion of the cap and extend into the concrete beam parallel to reinforcing rods R to secure the cap to the beam. Each leg of the end caps is provided with a hole 96 which is located so as to be in alignment with a hole 86 in the column plate and the corresponding notch 84 when the columns and beams are in position. Before the beams are cast, bolts 97 are inserted through holes 96 and the bolt heads 97' are welded to the inner surfaces of legs 93 and 94.

In assembling columns and beams having the connecting arrangement shown in FIGURES 17–20, the beams 90 are positioned on the plate 85 of column 80 so that bolts 97 extend downwardly through the holes 86 in the plate and nuts 98 are threaded on the bolts to firmly hold the beams on the column. After the beams are in place, the upper column 81 is positioned on the beam ends and the upper bolts 97 extend through openings 86 in the column end plate and nuts 98 are threaded on the bolts to hold the column in position. The connecting arrangement shown in FIGURES 17–20 is completely within the confines of the beams and columns and thus is necessary when the building specifications call for a door or a window immediately adjacent the juncture of a column and a beam.

My invention has a number of important features which include the rapid and accurate erection of precast columns and beams as well as structural steel columns and beams in building construction. By constructing a building with precast members in accordance with my invention, a positive connection may be obtained between beams and columns or between a pair of superposed columns without the use of connecting concrete and the consequent delay in erection. Additionally, no projections are present in the area of the connection to interfere with the location of windows and doors in the building.

While I have shown and described preferred embodiments of my invention, it may be otherwise embodied within the scope of the appended claims.

I claim:
1. A building construction comprising,
 (A) a precast concrete column having
  (1) an end plate secured to each end, said end plates extending beyond opposed sides of said column to provide a lip portion at each of said sides, and
  (2) bolt holes in each of said lip portions;
 (B) a precast concrete beam having
  (1) an end cap secured to each end, said end caps being C-shaped in cross-section and having
   (a) a base portion in contact with the end of said beam,
   (b) a pair of parallel legs extending along the upper and lower surfaces of the end of said beam,
   (c) bolt holes in each of said legs aligned with bolt holes in the opposite leg, and
   (d) pipes extending through the concrete beam connecting said aligned holes,
 (C) said holes and pipes in said beam ends being spaced apart the same distance as the holes in one of said lips whereby the holes in said lip and said legs and the pipes are aligned when an end of said beam is supported on the end plate of said column;
 (D) bolts extending through said aligned holes and pipes; and
 (E) nuts threaded on said bolts to positively connect said column and said beam.

2. A building construction as described in claim 1 and having,
 (A) a second precast concrete beam supported on the column having
  (1) an end cap secured to each end, said end caps being C-shaped in section and having
   (a) a base portion in contact with the end of said beam,
   (b) a pair of parallel legs extending along the upper and lower surfaces of the end of said beam,
   (c) bolt holes in each of said legs aligned with bolt holes in the opposite leg, and
   (d) pipes extending through the concrete beam conecting said aligned holes,
 (B) said holes and pipes in said beam ends being spaced apart the same distance as the holes in the other of said lips whereby the holes in said lip and said legs and the pipes are aligned when an end of said second beam is supported on said column;
 (C) bolts extending through said aligned holes and pipes; and
 (D) nuts threaded on said bolts to positively connect said column and said second beam.

3. A building construction as described in claim 1 and having,
 (A) a second column having
  (1) a plate secured to its lower end, said plate extending beyond opposed sides of said column to provide a lip portion at each of said sides, and
  (2) bolt holes in each of said lip portions,
 (B) said bolt holes being spaced in the same manner as the holes in said legs and the holes in the end plate of said concrete column whereby all of said holes are aligned when said second column is placed on the ends of said beams;
 (C) said bolts extending through the plate on said second column in addition to said end caps and the end plate on said concrete column; and
 (D) said nuts positively connecting said columns to said beams.

4. A building construction as defined in claim 1 and having,
 (A) the end plate on the upper end of said column formed with an extension extending beyond a third side of said column and bolt holes in said extension; and
 (B) the end caps of said beams formed with
  (1) extensions on the base portions,
  (2) extensions on the lower legs,
  (3) bolt holes in the extensions of said base portions and legs, and
  (4) side portions embedded in the surfaces of the beams and welded to said extensions,
 (C) the ends of the beams being spaced on the column to provide an opening for receiving the end of a structural beam and the lower leg extensions overlying the plate extension so that the bolt holes in the plate extension and the lower leg extensions are aligned;

(D) erection bolts passing through the aligned holes in the plate extension and the lower leg extensions to maintain said column and beams in position when a structural beam is inserted between the extensions of said base portions;

(E) a structural beam fitted between the extensions of said base portions and bolt holes in the end of said structural beam aligned with the holes in the extensions of said base portions; and (F) bolts extending through the aligned holes in the beam end and the extensions of said base portions to firmly connect the structual beam to the concrete beams.

5. A building construction comprising, (A) a lower precast concrete column having
 (1) an end plate secured to the upper end and embedded in the concrete so that only the upper surface is exposed,
 (2) holes in said end plate, and
 (3) bolts extending through said holes, the heads of said bolts being welded to the lower surface of said end plate;

(B) precast concrete beams, each of said beams having
 (1) an end cap secured to at least one end, each of said end caps having,
  (a) a base portion in contact with the end of the corresponding beam,
  (b) a pair of parallel legs extending along and embedded in the upper and lower surfaces of the end of the corresponding beam,
  (c) bolt holes in each of said legs aligned with bolt holes in the opposite leg,
  (d) pipes extending through the concrete beam connecting said aligned holes,
  (e) additional bolt holes in the upper legs of the end caps, and
  (f) bolts extending through said last mentioned holes, the heads of said bolts being welded to the lower surface of said upper legs;

(C) an upper precast concrete column having
 (1) notches formed in the lower end, said notches opening to the lower end and opposite sides of said column, and
 (2) an end plate secured to the lower end and extending beyond opposed sides of said column to provide a lip portion at each of said sides, said end plate having
  (a) apertures aligned with said notches, and
  (b) bolt holes in said lip portions, (D) said bolts on said lower end plate, said bolt holes and pipes in said end caps and said apertures and pockets in said upper column all being vertically aligned when said beam ends are positioned on said lower column and said upper column is positioned on said beam ends whereby said bolts extend through the pipes and apertures into said pockets and said bolt holes in said lip portions being aligned with the bolts on said upper legs of said end caps when the upper column is positioned on said beam ends whereby said bolts extend through the bolt holes in said lip portions; and (E) nuts threaded on the bolt ends in said pockets to positively connect said beams to said lower column and on said bolts extending through said lip portions to positively connect said upper column to said beam ends.

6. A precast concrete beam comprising, (A) an elongated concrete body;

(B) reinforcing rods extending substantially throughout the length of the body; and (C) an end cap secured at each end of the body, said end caps having
 (1) a base portion in contact with the ends of the body,
 (2) legs lying along the upper and lower surfaces adjacent the ends of the body,
 (3) bolt holes in the legs,
 (4) pipes extending through the ends of the body between the bolt holes to provide passageways for bolts, and
 (5) a plurality of dowels welded to the surface of the base portion in contact with the body and extending into the body to secure the end caps to the body.

7. A precast concrete beam as defined in claim 6 and having, (A) a forward extension having a bolt hole on the lower leg of each of said caps;

(B) a forward extension having bolt holes on the base portion of each of said caps; and (C) a side member lying along the forward surfaces of the body ends welded to the extensions of said legs and base portions to strengthen said extensions.

8. An end cap for use on precast concrete beams, said cap being C-shaped in cross-section and having (A) a base portion;

(B) a pair of opposed legs, each of said legs having a plurality of holes and the holes in one leg being aligned with the holes in the other leg;

(C) a plurality of pipes welded between the legs, each pipe interconnecting a hole in one leg with a hole in the other leg to provide passages between the legs; and (D) a plurality of metal dowels welded to the base portion and extending parallel to the legs for securing the cap to a precast concrete beam.

References Cited by the Examiner

UNITED STATES PATENTS

| | | | |
|---|---|---|---|
| 1,205,465 | 11/1916 | Maguire et al. | 52—252 |
| 2,724,261 | 11/1955 | Rensaa | 52—283 X |

FOREIGN PATENTS

| | | |
|---|---|---|
| 467,791 | 8/1950 | Canada. |
| 199,758 | 6/1923 | Great Britain. |
| 576,515 | 4/1946 | Great Britain. |
| 615,307 | 1/1961 | Italy. |

FRANK L. ABBOTT, *Primary Examiner.*

A. C. PERHAM, *Assistant Examiner.*